United States Patent
Liou et al.

(10) Patent No.: US 6,334,703 B1
(45) Date of Patent: Jan. 1, 2002

(54) LIGHT STICK FOR SCANNER

(76) Inventors: Kenneth Liou; Ting-Hao Hsiao, both of 9F, 108-3, Min-Chuan Rd., Hsin-Tian, Taipei Hsien (TW)

( * ) Notice: Subject to any disclaimer, the term of this patent is extended or adjusted under 35 U.S.C. 154(b) by 0 days.

(21) Appl. No.: 09/501,228

(22) Filed: Feb. 10, 2000

(51) Int. Cl.⁷ .................................................. F21V 7/04
(52) U.S. Cl. .................... 362/551; 385/510; 250/227.11
(58) Field of Search ................................ 362/294, 539, 362/547, 551; 250/227.11; 388/510, 509

(56) References Cited

U.S. PATENT DOCUMENTS

| | | | | |
|---|---|---|---|---|
| 5,555,160 A | * | 9/1996 | Tawara et al. | 362/31 |
| 6,161,939 A | * | 12/2000 | Bansbach | 362/31 X |
| 6,172,356 B1 | * | 1/2001 | Ogura et al. | 362/551 X |

* cited by examiner

*Primary Examiner*—Sandra O'Shea
*Assistant Examiner*—John Anthony Ward
(74) *Attorney, Agent, or Firm*—Rabin & Berdo, P.C.

(57) ABSTRACT

The present invention relates to a light stick for scanners which mainly includes a strip-shaped plate, wherein the broadside thereof protrudes outwards in an arched shape, and wherein a protruding strip is extended along the outer broadside of the arched strip-shaped plate and is semicircular in section, and wherein a protruding and rectangular rear seat is disposed at the other side of the strip-shaped plate and situated opposite to the protruding strip. And this rear seat has an arched surface at the center thereof and corresponds to the arc of the strip-shaped plate. Moreover, two light sources are disposed near two ends of the rear seat of the light stick respectively, and the light stick will not only achieve a broader scanning range with the least light sources due to the light refraction, light condensing and diffusion, but also the energy can be saved.

3 Claims, 5 Drawing Sheets

LIGHT STICK FOR SCANNER

BACKGROUND OF THE INVENTION

1. Field of the Invention

The present invention relates to a light stuck for a scanner, and mare particulary, to an improvement of the light stick for the short-range scanner which is created as a strip-shaped plate protruding outwards at the broadside to be an arched body while a protruding semicircular strip is mounted upon the strip-shaped plate. The light stick is a glass body so that a wider scanning range can be achieved by means of the refraction and reflection of light beams; in addition, only two light sources are respectively disposed near two ends of the rear side of the light stick. The emitted light is stronger than that of the conventional product with a number of lamps so that the cost of the energy and the material can be saved.

2. Description of the Prior Art

The conventional short-range scanner is a light-weight model and is used to scan the products at the commercial counter. The bar code on the commercial products is scanned first, and then the scanning results will be transferred to the monitor. This application is very convenient and its principle is shown in FIG. 4. The emitted light beams project on an identified object 50; thereafter, part of the light beams reflect back to the inside of the main unit, pass through a reflector 20, lens sets 30 to receive light sources and a receiving identifier 40 respectively, and through a signal cable to be sent to the display of the computer or the cash register in order to register the data (price, product category, manufacturer, etc.) of the commercial products rapidly and correctly. The present invention is used for this kind of scanner.

Referring to FIG. 6, the light sources in the conventional scanner consist of a number of lamps 61 as basic light which is passed through a strip-type light stick 70 to emit a more well-distributed light beam on the bar code for recognition. However, there are many defects in the embodiment of the prior art:

1. The conventional light stick is straight and strip-shaped so that, when the light stick receives the illumination of a number of lamps, then the light is straight emitted and the beamwidth is smaller than the length of the light stick. Accordingly, the available shining range is insufficient.
2. A number of lamps have to be provided in order to achieve the well-distributed light with sufficient illumination so that the cost of installing lamps increases tremendously.
3. The above-mentioned lamps are so many that more electricity power is wasted and when any of said lamps is damaged, an incorrect data might be sent, and this will bring a great loss to the owners, and sometimes it even will damage the commercial reputation thereof.

SUMMARY OF THE INVENTION

The primary object of the present invention is to provide a light stick for scanner which primarily includes a strip-shaped plate, wherein the broadside thereof protrudes outwards in an arched shape, and wherein a protruding strip is extended along the outer broadside of the arched strip-shaped plate and the section of the protruding strip is semicircular so that the broader light beams can be collected by the light stick and scattered outwards; thus, not only the light energy can be saved, but also a broader scanning range can be achieved.

Another object of the present invention is to provide a light stick for scanner, wherein a protruding and rectangular rear seat is disposed at the corresponding side to the protruding strip of the strip-shaped plate. This rear seat has an arched surface, which corresponds to the arc of the strip-shaped plate at the center thereof so that an excellent structure for light-concentrating effect is created. Moreover, two light sources are disposed near two ends of the rear seat of the light stick respectively, and the present invention will achieve the best effect with least light sources due to the light refraction and light condensing.

BRIEF DESCRIPTION OF THE DRAWINGS

In order that the present invention may more readily be understood the following description is given, merely by way of example with reference to the accompanying drawings in which.

DETAILED DESCRIPTION OF THE PREFERRED EMBODIMENT

Figure 1:
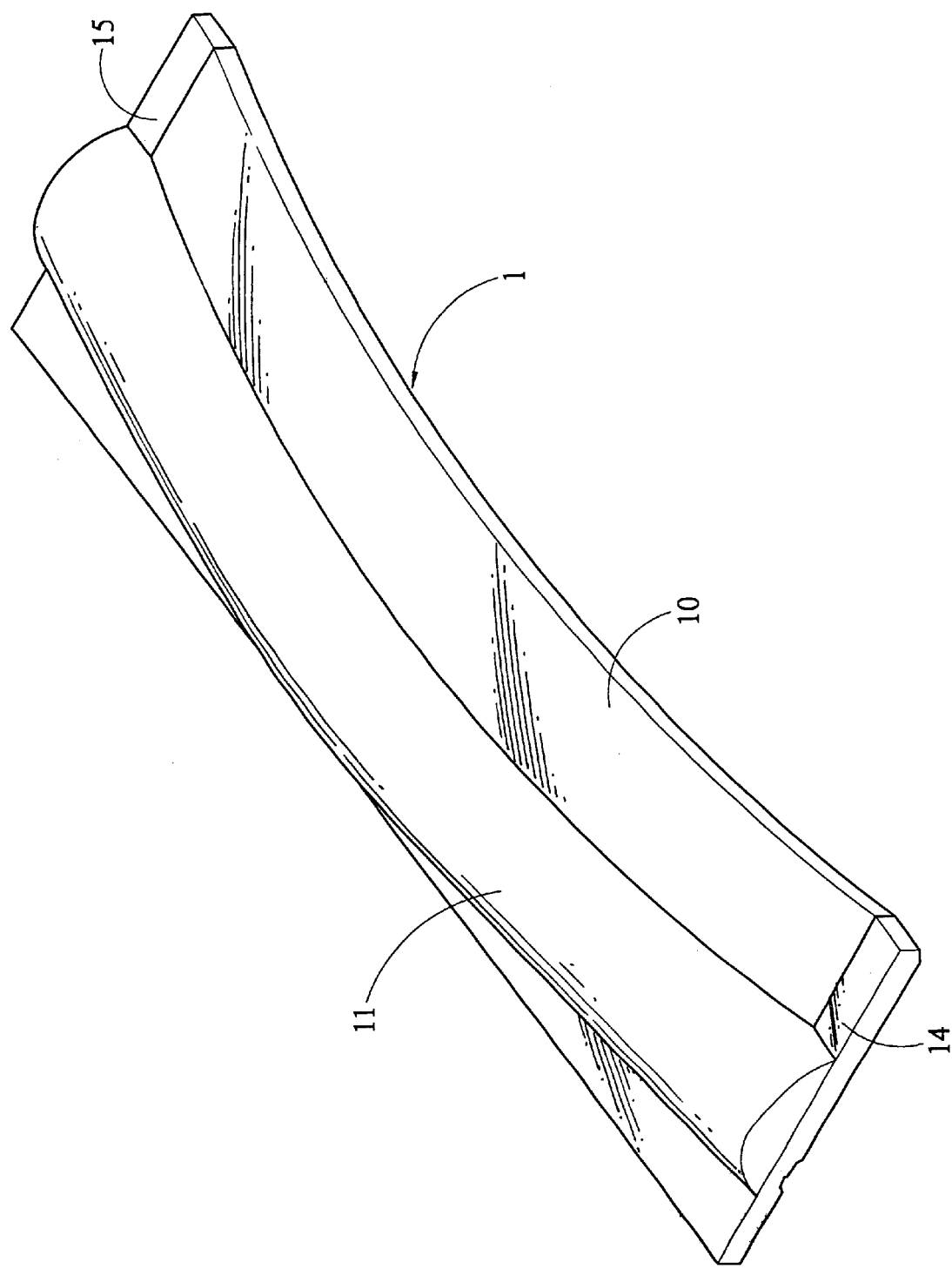
FIG. 1 is a perspective view of the front side of the present invention.
Figure 2:
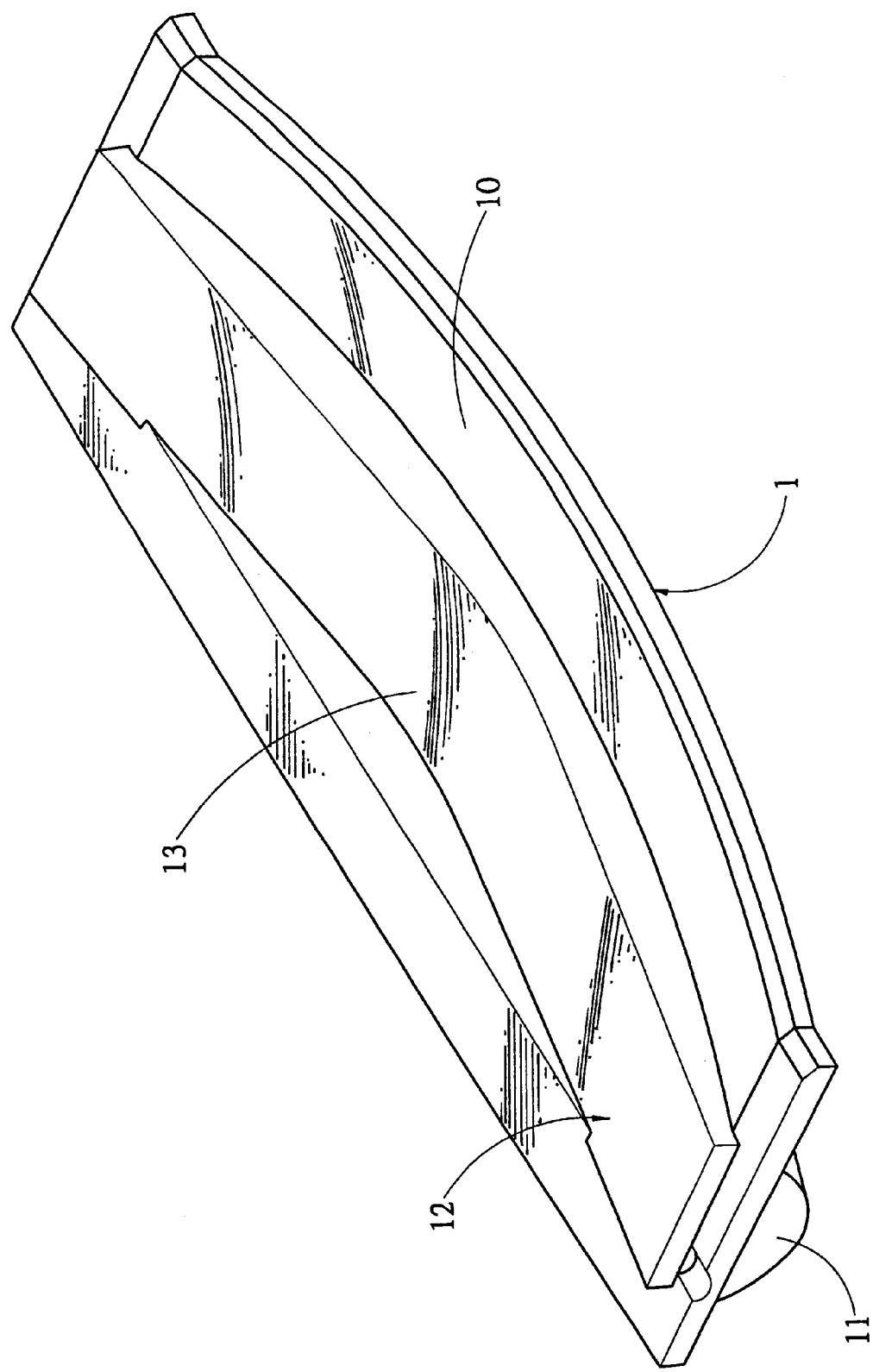
FIG. 2 is a perspective view of the rear side of the present invention.

First of all, referring to FIGS. 1, and 2, the light stick 1 inside of a scanner in accordance with the present invention mainly includes a strip-shaped plate 10. A broadside (primary surface) of plate 10 protrudes outwards in an arched shape while two flaps 14, 15 with a certain length are provided at two ends of a long side thereof respectively in order to be fitted to an inner side of the scanner. A protruding strip 11 extends along the outer upper broadside of the strip-shaped plate 10 and is semicircular in section. A protruding and rectangular rear seat 12 is disposed at the corresponding side to the protruding strip 11 of the strip-shaped plate 10. This rear seat 12 has an arched surface 13 at the center thereof and corresponds to the arc of the strip-shaped plate 10 so that an excellent structure for light-concentrating effect is created.

Figure 3:
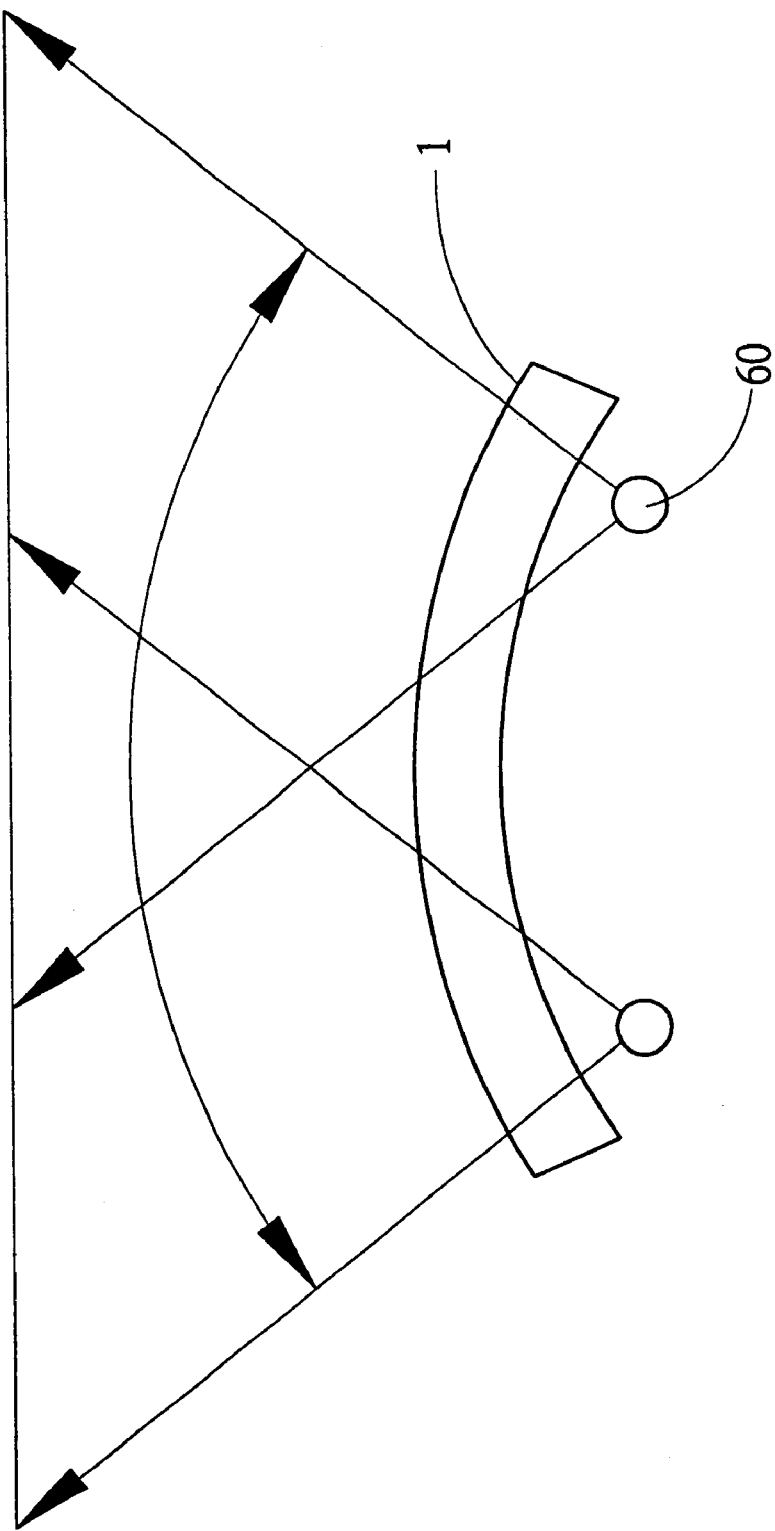
FIG. 3 is a schematic drawing of the application principle of the present invention.
Figure 4:
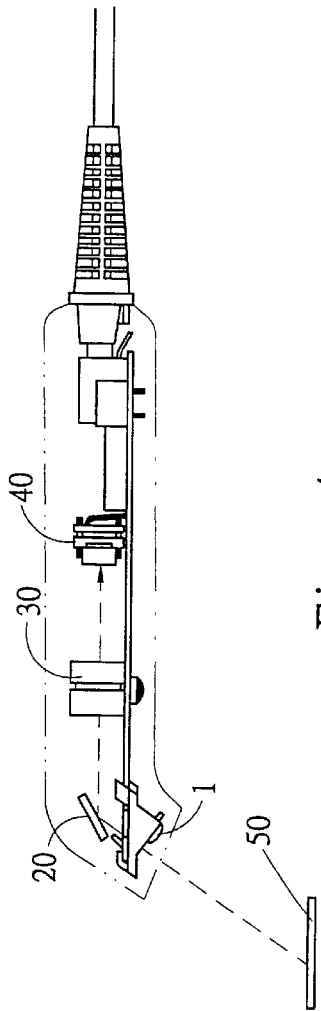
FIG. 4 is a schematic drawing of the work principle of a scanner in accordance with the present invention.
Figure 5:
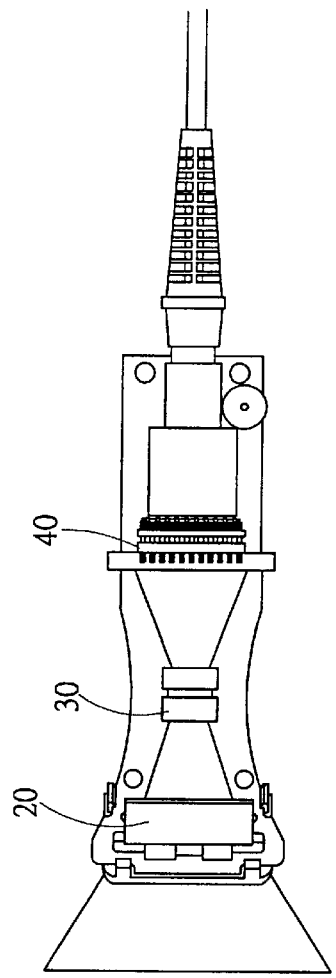
FIG. 5 is a top view of the present invention when it works.
Figure 6:
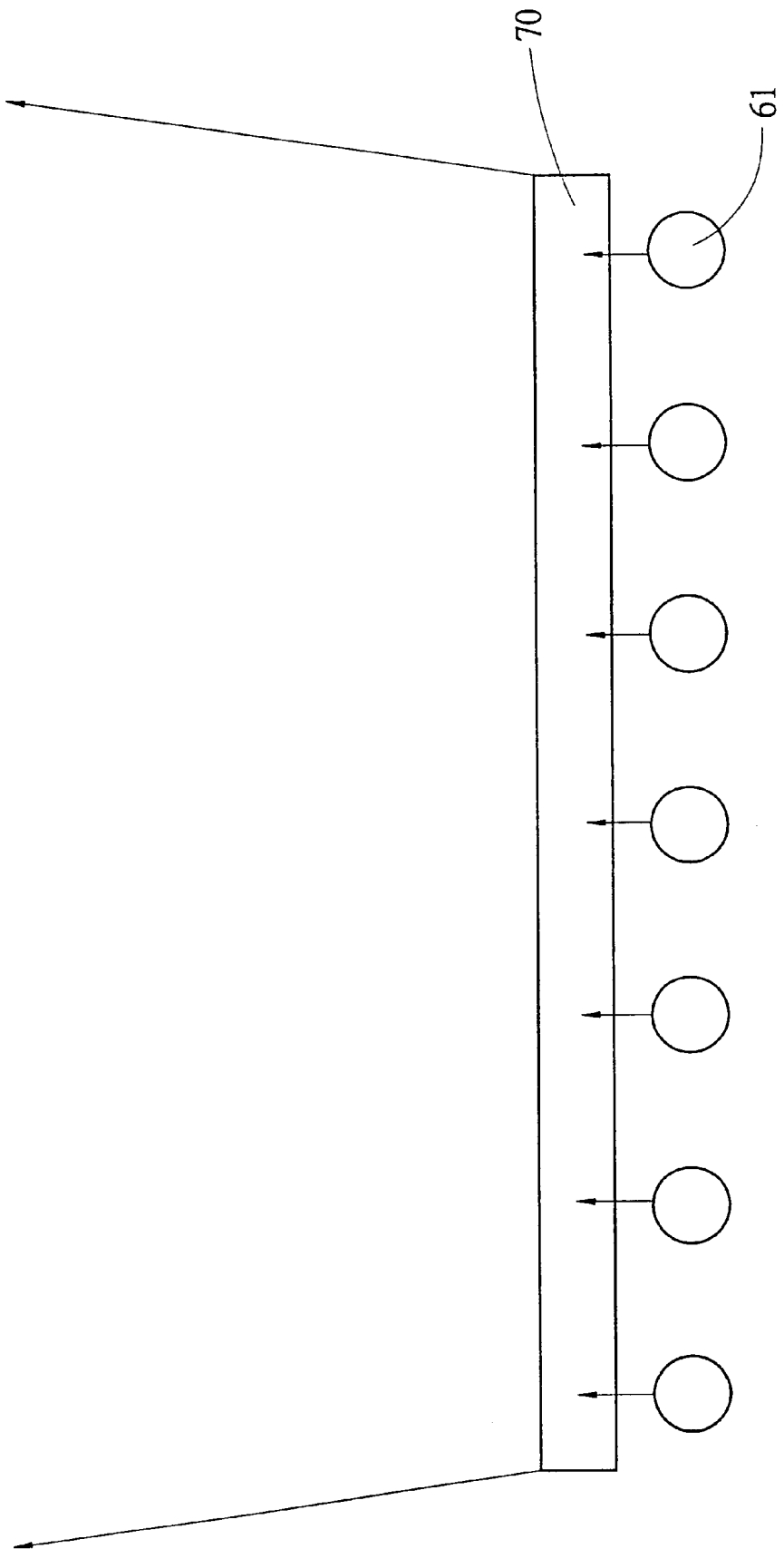
FIG. 6 is a schematic drawing of the work principle of a light stick of the prior art.

Referring to FIGS. 3, 4 and 5, the light stick 1 in accordance with the present invention has an arched shape with a light-concentrating effect so that not so much light from lamps 60 disposed at the arched side thereof is required. In accordance with the actual test result to the product of the present invention, the effect of two lamps (light sources) 60 disposed behind the light stick 1 and located a little outwards thereto is equal to that of the prior art with six or seven lamps 61 (as shown in FIG. 6). In addition, the outer side (the protruding side of the circular arc) of the light stick 1 will get broader light beams as they scatter outwards, and the reflection of short distance is applied to the present invention so that the light source created in accordance with the configuration of the present invention is enough for the reading task in scanning. In other words, the light stick in accordance with the present invention achieves the best effect with least light sources due to the light refraction and light condensing.

Concluded from the above-mentioned, the present invention has the following advantages:

1. Only two lamps as light source are required for completing the scanning task so that the electricity power and material of lamps can be saved.
2. The present invention includes a rear seat at the other side of the protruding strip so that the protruding strip, protruding strip and the rear seat have the light-concentrating effect and the money-saving goal can be achieved by using the least light sources to perform the reading task in scanning.
3. The present invention uses two lamps so that, when one of them is defective even under normal operation, the insufficient light source will be soon realized to replace it.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A light stick for a scanner, comprising:
    a strip-shaped plate that is longitudinally curved so as to be arch-shaped, said plate having two opposing primary curved surfaces;
    an arched protruding strip disposed on a first one of said primary curved surfaces, said protruding strip having a semicircular cross-sectional profile;
    an arched protruding rear seat disposed on a second one of said primary curved surfaces and in alignment with said protruding strip, said rear seat having a rectangular cross-sectional profile; and
    a light source disposed behind said protruding rear seat; wherein said strip-shaped plate, said protruding strip and said protruding rear seat collectively concentrate light passing from said light source and through the light stick.

2. The light stick recited in claim 1, wherein said light source comprises two lamp sources, each being respectively disposed near a respective end of said strip-shaped plate.

3. The light stick recited in claim 1, wherein said light source comprises only two lamp sources, each being respectively disposed near a respective end of said strip-shaped plate.

* * * * *